United States Patent [19]

Ueba et al.

[11] Patent Number: 4,828,359
[45] Date of Patent: May 9, 1989

[54] ALKYL METHACRYLATE HOMO - OR COPOLYMER OPTICAL WAVEGUIDE FOR ILLUMINATION AND PRODUCTION OF THE SAME

[75] Inventors: Yoshinobu Ueba; Norifumi Matsumiya, both of Osaka, Japan

[73] Assignee: Sumitomo Electric Industries, Ltd., Osaka, Japan

[21] Appl. No.: 817,099

[22] Filed: Jan. 8, 1986

[51] Int. Cl.$^4$ ................................................ G02B 6/16
[52] U.S. Cl. ............................ 350/96.34; 264/1.5; 350/96.30
[58] Field of Search ............... 350/96.29, 96.30, 96.31, 350/96.32, 96.33, 96.34; 264/1.5; 428/373, 394

[56] References Cited

U.S. PATENT DOCUMENTS

| | | | |
|---|---|---|---|
| 3,993,834 | 11/1976 | Chimura et al. | 428/373 |
| 4,505,543 | 3/1985 | Ueba et al. | 350/96.34 |
| 4,547,040 | 10/1985 | Yamamoto et al. | 350/96.34 |
| 4,564,263 | 1/1986 | Ueba et al. | 350/96.34 |
| 4,566,755 | 1/1986 | Ohmori et al. | 350/96.34 |
| 4,576,438 | 3/1986 | Tatsukami et al. | 350/96.34 |
| 4,593,973 | 6/1986 | Yoshida et al. | 350/96.29 |

FOREIGN PATENT DOCUMENTS 60-53903  3/1985  Japan ................. 350/96.34

*Primary Examiner*—John D. Lee
*Attorney, Agent, or Firm*—Cushman, Darby & Cushman

[57] ABSTRACT

An optical waveguide for illumination comprising a core made of a transparent polymer having a glass transition temperature not higher than 50° C. and a cladding made of a polymer having a lower refractive index than that of the core, which has good light transmission property and flexibility and is useful as an illumination element of an optical sensor.

10 Claims, 1 Drawing Sheet

4,828,359

ALKYL METHACRYLATE HOMO - OR COPOLYMER OPTICAL WAVEGUIDE FOR ILLUMINATION AND PRODUCTION OF THE SAME

FIELD OF THE INVENTION

The present invention relates to an optical waveguide for illumination and a method for producing the same. More particularly, it relates to a plastic optical waveguide useful for illumination in, for example, an optical sensor and a method for producing an optical waveguide including an optical image fiber and optionally a tube member and/or a continuous bore along the length of the waveguide. The optical waveguide is used in an optical communication system, an optical information system and an optical measuring instrument. In addition, it is usable as a fiber scope for medical use.

BACKGROUND OF THE INVENTION

Optical waveguides includes glass made ones and plastic made ones. Among them, the plastic optical waveguide is preferably used as a waveguide for illumination since the material itself is highly elastic and flexible.

An optical sensor transmits light and/or images and is composed of an optical waveguide as well as an optical image fiber and optionally a tube member and/or a continuous bore which transmit a fluid. FIG. 1 shows a cross section of one example of an optical waveguide for illumination to be used as a medical fiber scope. The optical waveguide 1 comprises a core 2 and outer and inner claddings 3 and 3'. The bores 4 surrounded with the inner claddings 3' are used for transporting a fluid or inserting an optical image fiber therein. The sizes of the core and cladding vary with the end use of the waveguide. Generally, a diameter of the core is from 0.25 to 1.00 mm, and a wall thickness of the cladding is from 10 to 20 μm (0.01 to 0.02 mm).

The conventional plastic optical fiber predominantly comprises a core made of polymethyl methacrylate (hereinafter referred to as "PMMA") although it may comprise a core made of other transparent plastics such as polystyrene. However, the number of highly transparent plastics is not large. A commercially available plastic optical fiber comprises a core made of PMMA or polystyrene. Between them, the former is more important, since it has better optical transmission characteristics than the latter.

The polymethacrylate type optical fiber includes the following three types:

(A) An optical fiber comprising a core made of PMMA and a cladding made of a fluororesin.

This type of the PMMA optical fiber has good light transmission characteristics and low attenuation due to absorption and is widely commercially available. However, it has a drawback that it shrinks to a great extent at a temperature higher than 100° C. For example, at 120° C., it shrinks to a length of about 50% of the original length in several seconds. This is because the PMMA optical fiber is stretched during fabrication so as to impart flexibility to the fiber since the unstretched PMMA optical fiber has poor flexibility. Therefore, when heated, the stretched PMMA optical fiber recovers to or toward the original state.

(B) An optical fiber comprising a core made of PMMA containing 5 to 30% by weight of a plasticizer and a cladding made of a fluororesin.

Since this second type of the PMMA optical fiber is flexible due to the presence of the plasticizer in PMMA, it is not necessary to stretch the optical fiber during fabrication. Therefore, it shrinks only to a small extent. However, the cladding of this type of the optical fiber should be made thicker than that of the optical fiber of the type A since diffusion and migration of the plasticizer should be prevented by the cladding. For example, the thickness of the cladding is usually 100 to 500 μm. Since light is transmitted through the core portion, the thicker cladding makes the core cross section smaller if the cross sectional area of the waveguide is the same so that the efficiency of light transmission of the waveguide becomes lower. In other words, for a constant cross section of the waveguide, it is preferable to make the core larger and the wall of the cladding thinner.

(C) An optical fiber comprising a core of polyisobutyl methacrylate and a cladding made of a fluororesin.

This optical fiber has substantially the same attenuation of light transmission and small shrinking rate as the PMMA optical fiber. However, this optical fiber is brittle and fragile, since polyisobutyl methacrylate is rigid and less flexible. Elongation at break is only about 5%. Thus, this fiber lacks the important advantage of the plastic optical fiber, namely resistance to bending and tension. The reason for this may be that isobutyl methacrylate has a branched butyl group.

It has been proposed to make an optical waveguide from a copolymer of isobutyl methacrylate/n-butyl methacrylate in a ratio of 4:1 to 2:3 (cf japanese patent publication No. 162849/1983), or PMMA or PMMA plasticized with adipate (cf. Japanese patent application No. 162847/1983). However, these optical waveguides are not completely satisfactory. For example, PMMA or the isobutyl methacrylate/n-butyl methacrylate copolymer is brittle and does not have enough flexibility. If the waveguide is stretched to impart flexibility to it, it shrinks when heated. PMMA plasticized with adipate has inferior light transmission characteristics since the plasticizer deteriorates the transparency of PMMA and scatters light. In addition, it is very difficult to obtain highly pure adipate by purification.

Hitherto, for the production of an optical waveguide containing an image fiber, there has been proposed several methods. Among them, the most advantageous methods are a method proposed in Japanese patent application No. 162847/1983 which comprises co-extruding a core material and a cladding material with simultaneously supplying a metal wire to a co-extrusion die to form an optical waveguide having the metal wire therein and then withdrawing the wire from the waveguide to form a bore therein. A method proposed in Japanese patent application No. 25866/1984 comprises co-extruding a core material and a cladding material with simultaneously supplying a hollow fiber made of a polymer or quartz to a co-extrusion die to form an optical waveguide having a bore therein.

However, the above proposed methods are not suitable for producing an optical sensor having a small outer diameter. This is because the optical image fiber or bundle should be inserted in a thin bore made in the optical waveguide during which the waveguide tends to be damaged by the inserted image fiber or bundle. In addition, by these methods, it is difficult to produce an optical sensor with flexibility and bending strength since the sensor contains the unstretchable metal wire or hollow fiber.

SUMMARY OF THE INVENTION

One object of the present invention is to provide an optical waveguide having good characteristics such as light transmission property and flexibility so as to be used as an element of an optical sensor.

Another object of the present invention is to provide a novel method for producing an optical waveguide containing an optical image fiber having a good flexibility and bending strength.

DETAILED DESCRIPTION OF THE INVENTION

Figure 1:
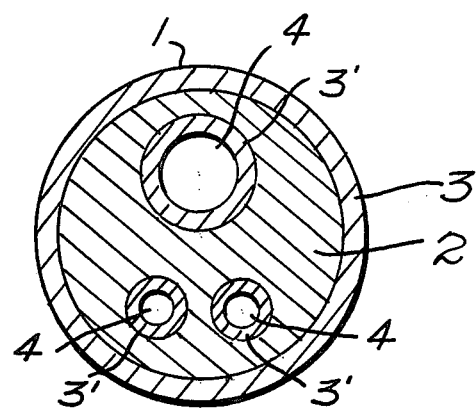
FIG. 1 is a cross section of one embodiment of an optical waveguide for illumination, FIG. 2 schematically shows one embodiment of an apparatus for producing an optical waveguide containing an image fiber.

According to one aspect of the present invention, there is provided an optical waveguide for illumination comprising a core made of a transparent polymer having a glass transition temperature not higher than 50° C. and a cladding made of a polymer having a lower refractive index than that of the core.

The transparent polymer of the core preferably has a glass transition temperature of 0° to 40° C. The transparent polymer may be a homo- or co-polymer of alkyl methacrylate. The alkyl group of the methacrylate is preferably a straight $C_3$-$C_8$, especially $C_3$-$C_6$ alkyl group, for example, n-propyl, n-butyl, n-pentyl and n-hexyl. The copolymer may comprise at least two different alkyl methacrylates, or at least one alkyl methacrylate and at least one other copolymerizable monomer (e.g. alkyl acrylate such as methyl acrylate and ethyl acrylate). In the copolymer, the content of alkyl methacrylate is preferably not smaller than 85 mole %.

The transparent polymer can be prepared by polymerizing the above monomer(s) in the presence of a conventional polymerization initiator used for initiating polymerization of methacrylate. Specific examples of the initiator are azo compounds such as 2,2'-azobisisobutyronitrile and azo-t-butane, and peroxide compounds such as butylperoxide. A chain transfer agent such as n-butylmercaptan and t-butylmercaptan may be used.

As the cladding material, any one of conventionally used polymers can be used so far as it has a lower refractive index than that of the core polymer. Specific examples of the cladding material are fluororesins (e.g. polyvinylidene fluoride, vinylidene fluoride/tetrafluoroethylene copolymer, homo- or co-polymer of fluorine-containing alkyl methacrylate and a blend thereof), silicone resins, ethylene/vinyl acetate copolymer and the like.

The optical waveguide for illumination of the invention may be produced by any method. For example, the waveguide is preferably produced by a method proposed in Japanese patent application No. 162847/1983 which comprises co-extruding a core material and a cladding material with simultaneously supplying a metal wire to a co-extrusion die to form an optical waveguide having the metal wire therein and then withdrawing the wire from the waveguide to form a bore therein, and a method proposed in Japanese patent application No. 25866/1984 which comprises co-extruding a core material and a cladding material with simultaneously supplying a hollow fiber made of a polymer or quartz to a co-extrusion die to form an optical waveguide having a bore therein.

An optical waveguide containing an image fiber is produced by a method of Japanese patent application No. 25866/1984 modified by replacing the hollow fiber with an image fiber. Therefore, according to another aspect of the present invention, there is provided a method for producing an optical waveguide comprising a core and a cladding and containing an image fiber therein, which comprises coextruding a core material and a cladding material with simultaneously supplying an image fiber to a co-extrusion die.

The image fiber is usually made of quartz, multicomponent glass or a polymer, and preferably has the number of picture elements of at least 6,000.

The method for producing the optical waveguide containing the image fiber will now be described by way of example, with reference to the accompanying drawings.

Figure 2:
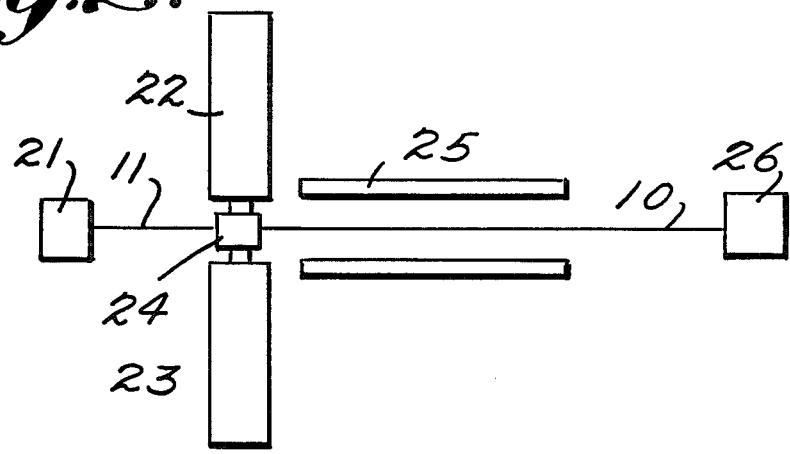
Figure 3:
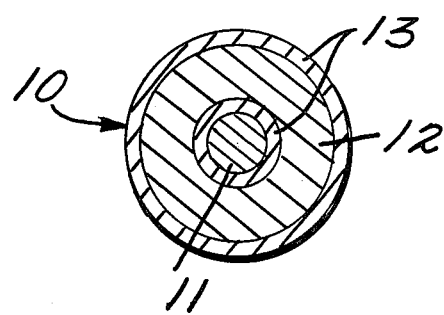
FIG. 3 is a cross section of one embodiment of an optical waveguide containing an image fiber.

FIG. 2 schematically shows one embodiment of an apparatus for producing the optical waveguide containing the image fiber according to the present invention. The core material and the cladding material are supplied from a core material extruder 22 and a cladding material extruder 23, respectively and co-extruded by a co-extrusion head 24. Simultaneously, an image fiber 11 is supplied from an image fiber supplier 21 to the head 24. The extruded waveguide containing the image fiber 10 in the core is passed through a cooling zone 25 and wound by a winder 26.

the produced wave guide containing the image fiber has a cross section for example as shown in FIG. 3, in which the image fiber 11 is surrounded by the optical image guide for illumination consisting of the core 12 and the claddings 13.

Although, in the above description, the number of the image fiber is one, two or more image fibers may be contained in the waveguide of the invention. Further, the hollow member can be contained in the waveguide together with the image fiber.

The present invention will be illustrated by following examples.

Examples 1 and 2 n-Butyl methacrylate (in Example 1) or a mixture of n-butyl methacrylate and methyl methacrylate in a molar ratio of 90:10 (in Example 2) was polymerized in the presence of 2,2'-azobisisobutyronitrile (0.01 mole %) (a polymerization initiator) and n-butylmercaptan (0.3 mole %) (a chain transfer agent) at 80° C. for 14 hours, at 100° C. for 4 hours and then at 130° C. for 4 hours. The glass transition temperatures of the produced polymer and copolymer were 20° C. and 29° C., respectively.

The polymer was drawn to form a fiber having an outer diameter of 1.0 mm and examined for physical properties (coefficient of thermal shrinkage, longitudinal elastic modulus, strength, elongation at break, allowable twisting and thermal decomposition temperature). The results are shown in the Table.

"Thermal shrinkage" is measured by keeping 100 mm of the fiber at 120° C. for 60 minutes.

"Longitudinal elastic modulus" and "elongation at break" are measured by means of an Instron tester.

"Strength" is tensile stress when the fiber starts to elongate during measuring modulus by the Instron tester.

"Allowable twisting" is the number of turns per unit length (1 m) when the fiber starts to break by twisting.

The polymer as the core material was extruded at 130° C. together with a cladding material (copolymer of tetrafluoropropyl methacrylate and octafluoropentyl methacrylate in a molar ratio of 30:70) on three annealed copper wires having various diameters in an unstretched state. Then, the copper wires were removed from the core to form an optical waveguide having three bore in the core as shown in FIG. 1. The outer diameter of the waveguide was 2.2 mm, the bore diameter of the large bore was 0.5 mm and the bore diameter of each of the two small bores was 0.02 mm. The attenuation of light transmission of the waveguide was measured as follows:

He-Ne laser light having a wavelength of 633 nm was transmitted through the waveguide of 5 m in length. The attenuation of light transmission L is calculated according to the following equation:

$$L = -10/l \log I/I_0$$

wherein $I$ is strength of incident light, $I_0$ is strength of outgoing light and $l$ is the length of the waveguide.

Comparative Example 1

In the same manner as in Examples 1 and 2 but using as a core material PMMA having a glass transition temperature of 105° C., an waveguide was produced and examined for the same properties as in Examples 1 and 2.

TABLE

|  | Example 1 | Example 2 | Comp. Example 1 |
|---|---|---|---|
| Coefficient of thermal shrinkage (%) | 4 | 4 | 49 |
| Longitudinal elastic modulus (kg/mm$^2$) | 17.7 | 56.8 | 350 |
| Tensile strength (kg/mm$^2$) | 0.35 | 0.83 | 12.0 |
| Elongation at break (%) | 280 | 210 | 80 |
| Allowable twisting (turns/m) | 9.3 | 2.7 | 14.1 |
| Thermal decomposition temperature (°C.) | 265 | 230 | 300 |
| Attenuation (dB/km) | 400 | 400 | 400 |

Example 3

By means of an apparatus as shown in FIG. 2, n-butylmethacrylate polymer having a glass transition temperature of 20° C. as the core material and a copolymer of tetrafluoropropyl methacrylate/octafluoropentyl methacrylate in a molar ratio of 30:70 as a cladding material was co-extruded with supplying a quartz made image fiber having 6,000 picture elements to produce a waveguide containing the image fiber in the core, a cross section of which is shown in FIG. 3. The outer diameter of the waveguide was 0.75 mm, and the wall thickness of each of the claddings was 20 μm. Elongation at break, 280%. Allowable twisting, 9.3 turns/m. Attenuation of light transmission, 400 dB/km. (These were measured by the same manners as in Examples 1 and 2).

What is claimed is:

1. An optical waveguide for illumination comprising a core made of a transparent polymer having a glass transition temperature not higher than 50° C. and a cladding made of a polymer having a lower refractive index than that of the core and surrounding the core.

2. An optical waveguide according to claim 1, wherein the transparent polymer of the core has a glass transition temperature of 0° to 40° C.

3. An optical waveguide according to claim 1, wherein the transparent polymer is a homo- or co-polymer of alkyl methacrylate.

4. An optical waveguide according to claim 3, wherein the alkyl methacrylate is at least one selected from the group consisting of n-propyl methacrylate, n-butyl methacrylate, n-pentyl methacrylate and n-hexyl methacrylate.

5. An optical waveguide for illumination comprising a core made of a transparent polymer having a glass transition temperature not higher than 50° C. and a cladding made of a polymer having a lower refractive index lower than that of the core and surrounding the core; wherein said transparent polymer is a copolymer of alkyl methacrylate and another copolymerizable monomer; and wherein said alkyl methacrylate comprises no less than 85% of said copolymer.

6. An optical waveguide according to claim 5, wherein said other monomer is methyl methacrylate.

7. A method for producing an optical waveguide comprising a core and a cladding and containing an image fiber therein, the method comprising the steps of:
co-extruding a core material and a cladding material, and simultaneously supplying an image fiber to a co-extrusion die, wherein the core material is a transparent polymer having a glass transition temperature not higher than 50° C. and the cladding material has a lower refractive index than that of the core material.

8. A method according to claim 7, wherein the transparent polymer of the core has a glass transition temperature of 0° to 40° C.

9. A method according to claim 7, wherein the transparent polymer is a homo- or co-polymer of alkyl methacrylate.

10. A method according to claim 9, wherein the alkyl methacrylate is at least one selected from the group consisting of n-propyl methacrylate, n-butyl methacrylate, n-pentyl methacrylate and n-hexyl methacrylate.

* * * * *